US006133684A

United States Patent [19]

Kawaharada

[11] Patent Number: 6,133,684

[45] Date of Patent: Oct. 17, 2000

[54] ELECTRON GUN WITH POLYGONAL SHAPED RIM ELECTRODE

[75] Inventor: Takahiro Kawaharada, Fukaya, Japan

[73] Assignee: Kabushiki Kaisha Toshiba, Kawasaki, Japan

[21] Appl. No.: 09/106,352

[22] Filed: Jun. 29, 1998

[30] Foreign Application Priority Data

Jun. 30, 1997 [JP] Japan .................................. 9-174203

[51] Int. Cl.$^{7}$ ................................................ H01S 29/50

[52] U.S. Cl. ......................................... 313/414; 313/412

[58] Field of Search .................................. 313/412, 414, 313/458; 315/368.05, 382.1

[56] References Cited

U.S. PATENT DOCUMENTS

| | | | |
|---|---|---|---|
| 4,370,592 | 1/1983 | Hughes et al. | 313/414 |
| 4,626,738 | 12/1986 | Gerlach | 313/414 |
| 4,766,344 | 8/1988 | Say | 313/414 |

FOREIGN PATENT DOCUMENTS

| | | |
|---|---|---|
| 2-18540 | 4/1990 | Japan . |
| 4-44379 | 7/1992 | Japan . |
| 7-226170 | 8/1995 | Japan . |

*Primary Examiner*—Michael H. Day

*Attorney, Agent, or Firm*—Oblon, Spivak, McClelland, Maier & Neustadt, P.C.

[57] ABSTRACT

A electron gun includes three cathodes aligned in line, and a plurality of electrodes sequentially arranged from these cathodes in a direction in which the cathodes emit electron beams, wherein, of the plurality of electrodes, the facing portions of a convergence electrode and a final acceleration electrode forming a main lens are respectively constructed by cylindrical common peripheral rim electrodes long in the inline direction which form aperture holes common to the three electron beams, and the inner circumferential surface of the peripheral rim electrode of at least one of the convergence electrode and the final acceleration electrode has an almost polygonal shape with substantially six or more sides so as to correct any multipole lens components.

6 Claims, 4 Drawing Sheets

ELECTRON GUN WITH POLYGONAL SHAPED RIM ELECTRODE

BACKGROUND OF THE INVENTION

The present invention relates to an electron gun for a color cathode-ray tube and, more particularly, to an electron gun for an inline color cathode-ray tube capable of displaying an image at a high resolution.

A BPF (BiPotential Focus) electron gun like the one shown in FIG. 1 has conventionally been known as a general electron gun for a color cathode-ray tube.

As shown in FIG. 1, this BPF electron gun is composed of three cathodes KR, KG, and KB including heaters and aligned in line, and a plurality of electrodes, i.e., first, second, third, and fourth grids G1, G2, G3, and G4 sequentially arranged from the cathodes direction in which these cathodes emit electron beams.

In the BPF electron gun having this arrangement, an electron beam is generated by a triode portion made up of the cathodes KR, KG, and KB, the first grid G1, and the second grid G2. The electron beam is finally focused on a phosphor screen by a prefocus lens portion formed by the second and third grids G2 and G3, and a main lens portion (ML) formed by the third and fourth grids G3 and G4.

In general, one of the factors that largely influence the focusing characteristics of a color cathode-ray tube is the aperture of the main lens of an electron gun. As the aperture of the main lens increases, the magnification and aberration can be decreased to obtain a smaller beam spot on a phosphor screen.

In the electron gun for an inline color cathode-ray tube, however, since electrodes corresponding to the three cathodes are integrally placed on the same plane and accommodated in a neck tube whose inner size is limited, the aperture and spacing of electrodes forming the main lens are greatly limited. That is, demands for a larger aperture of the main lens is very difficult to meet.

For this reason, the facing end faces of the third and fourth grids G3 and G4 forming the main lens are constructed by cylindrical peripheral rim electrodes with elliptical sections, and a common lens is formed for three electron beams to obtain a field superposition large-aperture lens.

In this arrangement, however, since the main lens is an elliptical rotation-asymmetrical lens, the horizontal aperture is larger than the vertical aperture, and thus penetration of the electric field is larger in the horizontal direction than in the vertical direction. Accordingly, the lens focuses more strongly in the vertical direction to cause astigmatism in focusing an electron beam.

Jpn. Pat. Appln. KOKOKU Publication No. 2-18540 discloses an arrangement in which a correction electrode plate with noncircular aperture holes through which three electron beams pass and have a hole diameter smaller in the horizontal direction than in the vertical direction is arranged inside the peripheral rim electrode or on its bottom. With this arrangement, horizontal penetration of the electric field can be suppressed to make horizontal and vertical focusing effects uniform and to correct any astigmatism.

On the main lens having this structure, however, penetration of the electric field is smaller for the side beams than for the center beam, and the lens focuses the side beams more strongly. In focusing the electron beams, the side beams suffer more spherical aberration. In each side beam, penetration of an electric field on the outer side (side facing the center beam) is smaller than on the center beam side, and a lens aperture difference is generated. As a result, the beam spot has a shape as shown in FIG. 2. More specifically, while a center beam 30G forms a substantially circular beam spot, side beams 31R and 31B form distorted beam spots with largely spread halos 32R and 32B, causing coma.

To correct the coma, the side beam aperture hole of the main lens must have a diameter as large as possible. However, since the horizontal diameter of the beam aperture hole of the correction electrode is set small in order to correct the above-described astigmatism, the effective diameter of the side beam aperture hole cannot be increased.

Jpn. Pat. Appln. KOKOKU Publication No. 4-44379 discloses an electron gun having an arrangement wherein a correction electrode prepared by removing those portions of its right and left ends which are in contact with a peripheral rim electrode, and forming only an aperture hole through which a center beam passes is arranged to surround the side beams by the end portions of the correction electrode and the peripheral rim electrode. In this electron gun, penetration of an electric field of the side beams on the facing side to the center beam is enhanced, and the aperture of the side beam aperture hole is increased, thereby correcting any spherical aberration and coma.

In this electron gun, however, since those portions of the right and left ends of the correction electrode which are in contact with the peripheral rim electrode are removed, the astigmatism correction effect for the side beams decreases to fail satisfactory astigmatism correction, resulting in a low resolution of the color cathode-ray tube.

In an arrangement disclosed in Jpn. Pat. Appln. KOKAI Publication No. 7-226170, the effective aperture is increased by the following method. In a high-voltage electrode of two cylindrical electrodes constituting a main lens, that surface of the peripheral wall forming an opening, which faces a low-voltage electrode, has a shape defined by upper and lower straight lines parallel to the inline direction and having their respective terminating points connected to circular arcs having the tube axis as a center. In the low-voltage electrode, that surface of the peripheral wall forming an opening, which faces the high-voltage electrode, has a shape defined by upper and lower straight lines parallel to the inline direction and having their respective terminating points connected to elliptical arcs curved outward.

In this case, although the lens aperture for the side beams can be increased, astigmatism occurs in the horizontal, vertical, and diagonal directions of the side beams. For this reason, if astigmatism is corrected by the correction electrode, as described above, the lens aperture for the side beams decreases. In addition, coma easily occurs for the side beams. Accordingly, desired lens performance cannot be obtained owing to two contradiction demands for increase a lens aperture and correction of astigmatism.

BRIEF SUMMARY OF THE INVENTION

As described above, in the conventional inline color cathode-ray tube, even when the main lens is formed in the electron gun by an elliptical peripheral rim electrode, and a correction electrode having three noncircular electron beam aperture holes, astigmatism, spherical aberration, and coma for the side beams cannot be satisfactorily eliminated. As a result, each side beam forms a distorted spot with a halo, greatly decreasing the resolution of the color cathode-ray tube.

Further, astigmatism, spherical aberration, and coma of the side beams obstruct an increase in effective aperture of the main lens.

The present invention has been made to solve the problems, and has as its object to provide an electron gun for a color cathode-ray tube in which a small beam spot free from any distortion can be formed on a phosphor screen without decreasing the effective diameter of a main lens.

According to the first aspect of the present invention, there is provided an electron gun for a color cathode-ray tube, comprising three cathodes aligned in line, and a plurality of electrodes sequentially arranged from the three cathodes in a direction in which the cathodes to emit three electron beams, wherein, of the plurality of electrodes, facing portions of a convergence electrode and a final acceleration electrode forming a main lens respectively construct long cylindrical common peripheral rim electrodes having aperture holes through which the three electron beams pass, and an inner circumferential surface of the peripheral rim electrode of at least one of the convergence electrode and the final acceleration electrode has a shape for correcting a multipole lens component of the main lens.

According to the second aspect of the present invention, there is provided an electron gun for a color cathode-ray tube, comprising three cathodes aligned in line, and a plurality of electrodes sequentially arranged from the three cathodes in a direction in which the cathodes emit three electron beams, wherein, of the plurality of electrodes, facing portions of a convergence electrode and a final acceleration electrode forming a main lens respectively construct long cylindrical common peripheral rim electrodes having aperture holes through which the three electron beams pass, and an inner circumferential surface of the peripheral rim electrode of at least one of the convergence electrode and the final acceleration electrode has one of a polygonal shape with substantially at least six sides and a polygonal-like shape angulated among each sides.

According to the third aspect of the present invention, there is provided a color cathode-ray tube comprising an envelope made up of a panel, a funnel, and a neck, an inner conductive film formed from an inner wall of the funnel to an inner wall of the neck, a cathode located at an end portion in the neck, and an inline electron gun having a plurality of electrodes sequentially arranged from the cathode side at intervals so as to form an electron lens, wherein, of the plurality of electrodes, facing portions of a convergence electrode and a final acceleration electrode forming a main lens respectively construct long cylindrical common peripheral rim electrodes having aperture holes through which three electron beams passes, and an inner circumferential surface of the peripheral rim electrode of at least one of the convergence electrode and the final acceleration electrode has a shape for correcting a multipole lens component of the main lens.

According to the present invention, the inner circumferential surface of the peripheral rim electrode of at least one of the convergence electrode and the final acceleration electrode has an almost polygonal shape with six or more sides so as to correct a multipole lens component. With this arrangement, astigmatism, coma, and spherical aberration of the side beams can be eliminated, and the effective aperture of the main lens can be satisfactorily increased. Further, the beam shapes of three electron beams can be made uniform, and a high resolution can be obtained over the entire screen.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
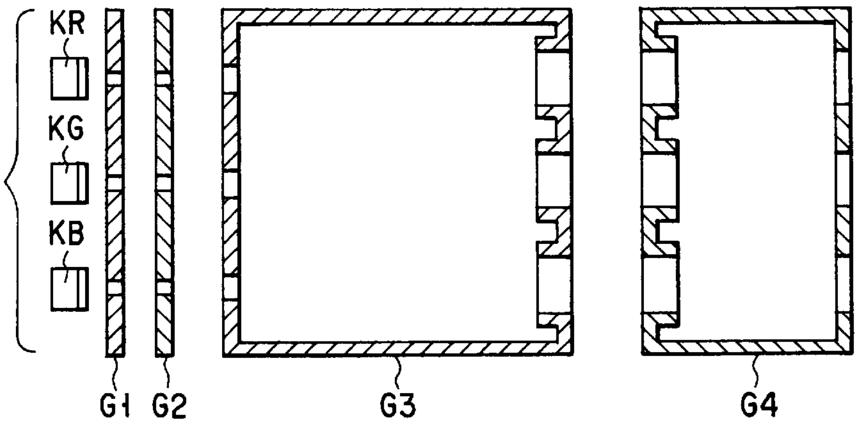
BACKGROUND ART FIG. 1
FIG. 1 is a sectional view for explaining a conventional BPF electron gun.
Figure 2:
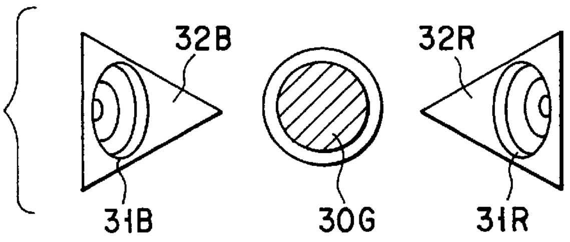
BACKGROUND ART FIG. 2
FIG. 2 is a view showing the shape of a beam focused on a phosphor screen by the conventional electron gun.

To solve the above problems, according to the present invention, there is provided an electron gun for a color cathode-ray tube, comprising three cathodes aligned in line, and a plurality of electrodes sequentially arranged from the three cathodes in a direction in which the cathodes to emit three electron beams, wherein, of the plurality of electrodes, facing portions of a convergence electrode and a final acceleration electrode forming a main lens respectively construct long cylindrical common peripheral rim electrodes having aperture holes through which the three electron beams pass, and an inner circumferential surface of the peripheral rim electrode of at least one of the convergence electrode and the final acceleration electrode has a shape for correcting a multipole lens component of the main lens.

In the electron gun for the color cathode-ray tube having this arrangement, the inner circumferential surface of the peripheral rim electrode of at least one of the convergence electrode and the final acceleration electrode preferably has a polygonal shape with substantially at least six sides.

Alternatively, the inner circumferential surface of the peripheral rim electrode of at least one of the convergence electrode and the final acceleration electrode desirably has a polygon-like shape having substantially six or more sides and curved corner portions.

Further, an electrode plate for splitting three electron beams in line can be located on the bottom of at least one peripheral rim electrode or a position set back from the facing surface thereof.

According to the present invention, there is provided a color cathode-ray tube comprising an envelope made up of a panel, a funnel, and a neck, an inner conductive film formed from an inner wall of the funnel to an inner wall of the neck, three cathodes located at an end portion in the neck, and an inline electron gun having a plurality of electrodes sequentially arranged at intervals from the cathode side in a direction in which the cathodes emit three electron beams so as to form an electron lens, wherein, of the plurality of electrodes, facing portions of a convergence electrode and a final acceleration electrode forming a main lens respectively construct long cylindrical common peripheral rim electrodes having aperture holes through which three electron beams pass, and an inner circumferential surface of the peripheral rim electrode of at least one of the convergence electrode and the final acceleration electrode has a shape for correcting a multipole lens component.

Since the peripheral rim electrode of at least one of the convergence electrode and the final acceleration electrode is formed into the above shape, penetration of the electric field is enhanced in the side beams to weaken the side beam focusing effect. This is because diagonal penetration of the electric field by decreasing the opening-diameter of the peripheral rim electrode in the diagonal direction of each side beam along with this, horizontal penetration of the electric field decreases and the horizontal lens aperture increases can be suppressed by. Particularly, penetration of the electric field on the outer side of each side beam, i.e. side facing the center beam, can be increased.

The lens apertures for the side beams in the horizontal, vertical, and diagonal directions therefore coincide with each other to reduce any astigmatism, coma, and spherical aberration.

Consequently, vertical and horizontal focusing effects for the center beam and the side beams become uniform. A large-aperture lens free from any aberration for the side beams can be formed, and a small beam spot free from any distortion can be obtained on the phosphor screen.

An embodiment of the present invention will be described below with reference to the several views of the accompanying drawing.

Figure 3:
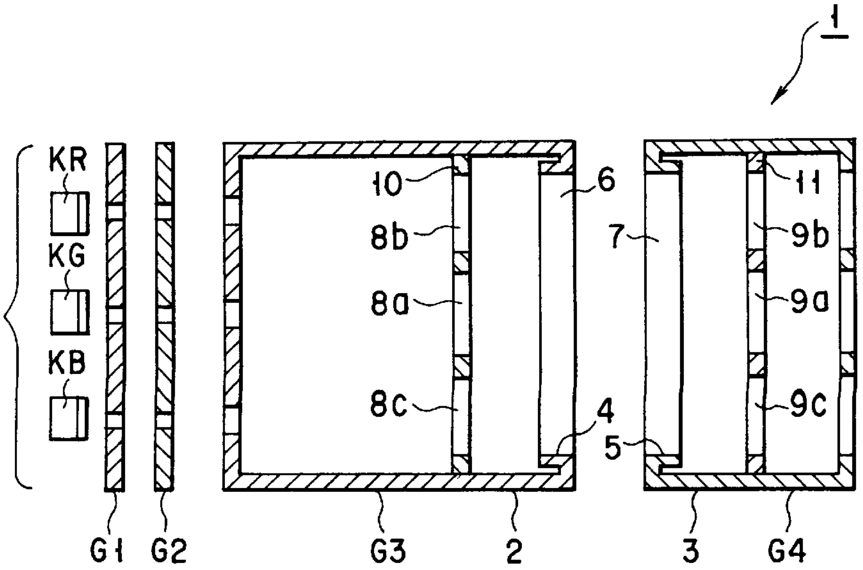
FIG. 3 is a cross-sectional view showing an electron gun for a color cathode-ray tube according to the first embodiment of the present invention.

FIG. 3 is a sectional view showing an electron gun for a color cathode-ray tube according to an embodiment of the present invention. As shown in FIG. 3, an electron gun 1 comprises three cathodes KR, KG, and KB horizontally aligned in line, three heaters (not shown) for heating these cathodes, and first, second, third, and fourth grids G1, G2, G3, and G4 sequentially arranged in front of the cathodes toward a phosphor screen. These components are integrally fixed by a pair of insulating supports (not shown).

In the electron gun 1, the convergence electrode G3 (third grid) and the final acceleration electrode G4 (fourth grid), which constitute a main lens, are constructed by peripheral rim electrodes 2 and 3 long in the inline direction. The facing portions of the electrodes 2 and 3 are cylindrical opening portions 6 and 7 with portions 4 and 5 bent inward. The peripheral rim electrodes 2 and 3 respectively accommodate electrode plates 10 and 11 each having three noncircular electron beam aperture holes 8*a* to 8*c* or 9*a* to 9*c* aligned in the inline direction.

Figure 4A:
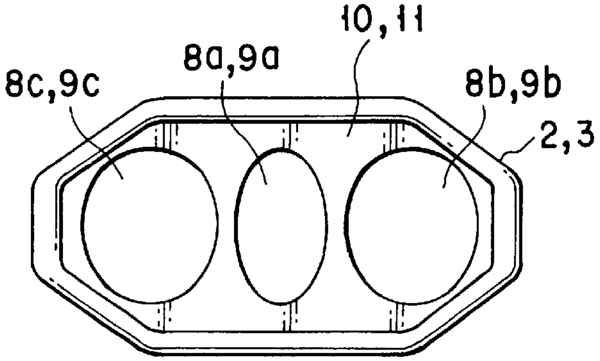
FIGS. 4A to 4C are views, respectively, showing an electron gun for a color cathode-ray tube according to the second embodiment of the present invention.
Figure 4B:
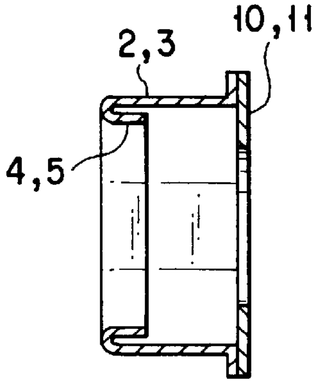
Figure 4C:
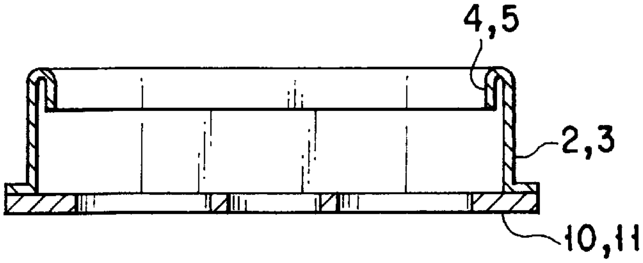

The convergence electrode G3 and the final acceleration electrode G4 have roughly the same sectional shape. FIG. 4A is a plan view of the convergence electrode G3 or final acceleration electrode G4 of the electron gun shown in FIG. 3. FIG. 4B is a sectional view viewed from the inline direction. FIG. 4C is a sectional view viewed from a direction perpendicular to the inline direction. As shown in FIGS. 4A to 4C, the inner and outer circumferential surfaces of the peripheral rim electrodes 2 and 3 and the inner circumferential surface 4, 5 and outer circumferential surface of the cylindrical opening portions 6 and 7 have, e.g., a nearly octagonal shape elongated in the inline direction. More specifically, those portions of the inner circumferential surface 4, 5 and outer circumferential surface of the peripheral rim electrodes 2 and 3, which are in the diagonal directions of the side beams, and the corresponding portions of the inner and outer circumferential surfaces of the cylindrical opening portions 6 and 7 correspond to four short sides. Therefore, the distances from the center of each side beam to the inner and outer circumferential surfaces of the peripheral rim electrodes 2 and 3, and the distances to the inner circumferential surface 4, 5 and outer circumferential surface of the cylindrical opening portions 6 and 7 are smaller in the diagonal direction than in the horizontal direction.

In the electrode plates 10 and 11, the side beam aperture holes 8*b*, 8*c*, 9*b*, and 9*c* are larger in horizontal diameter than the center beam aperture holes 8*a* and 9*a*.

In the electron gun having this arrangement, penetration of the electric field is enhanced in the side beams to weaken the side beam focusing effect. Accordingly, the lens aperture for the side beams increases, and vertical and horizonal focusing effects for the center beam and the side beams become uniform.

This is because diagonal penetration of the electric field can be suppressed by decreasing the diagonal distance from the center of the side beam to the peripheral rim electrode, and along with this, horizontal penetration of the electric field increases equivalently and the horizontal lens aperture increases. Since the lens aperture on the outer side of each side beam (side facing the center beam) can be increased, the lens apertures for the side beams in the horizontal, vertical, and diagonal directions coincide with each other. Accordingly, astigmatism, coma, and spherical aberration can be eliminated.

As a result, both the center beam and the side beams can form nearly circular beam spots free from any halo on the phosphorus screen, and a high resolution can be attained over the entire screen.

Figure 5A:
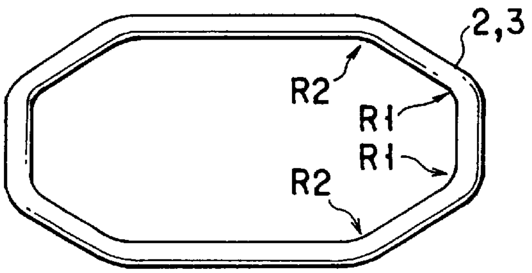
FIGS. 5A to 5C are views, respectively, showing an electron gun for a color cathode-ray tube according to the third embodiment of the present invention.
Figure 5B:
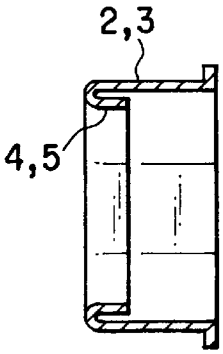
Figure 5C:
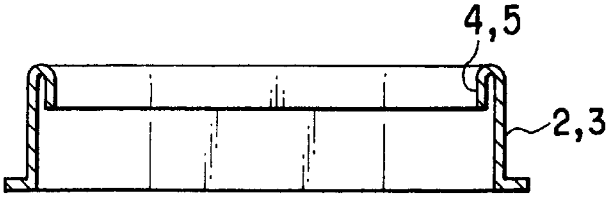

The same effects can also be obtained when the inner circumferential surfaces of the peripheral rim electrodes 2 and 3 and the inner circumferential surface of the opening portion have an almost octagonal shape, and the respective sides are connected by circular arcs, as shown in FIG. 5A. FIG. 5A is a plan view of the convergence electrode G3 or final acceleration electrode G4. FIG. 5B is a sectional view viewed from the inline direction. FIG. 5C is a sectional view viewed from a direction perpendicular to the inline direction.

Figure 6A:
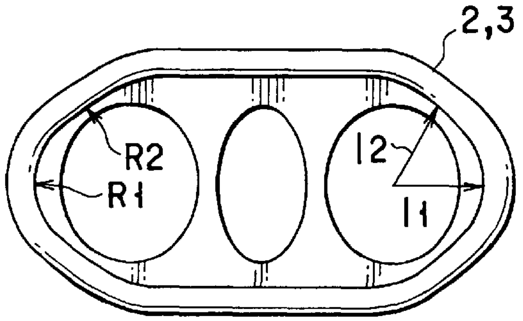
FIGS. 6A to 6C are views, respectively, showing an electron gun for a color cathode-ray tube according to the fourth embodiment of the present invention.
Figure 6B:
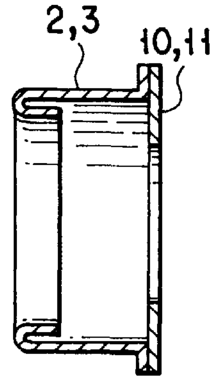
Figure 6C:
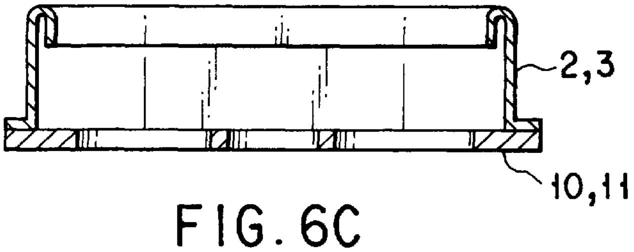

In addition, the same effects can be obtained even if the inner circumferential surfaces of the peripheral rim electrodes 2 and 3 and the inner circumferential surface of the opening portion have a shape similar to an octagon, and the sides of the octagon are circular arcs ($R_1$ and $R_2$) or straight lines, as shown in FIG. 6A. In this case, a diagonal distance $l_2$ from the center of the section of each side beam to the inner circumferential surface is shorter than a horizontal distance $l_1$ from the center of the section of the side beam to the inner circumferential surface. FIG. 6A is a plan view of the convergence electrode G3 or final acceleration electrode G4. FIG. 6B is a sectional view viewed from the inline direction. FIG. 6C is a sectional view viewed from a direction perpendicular to the inline direction.

Figure 7A:
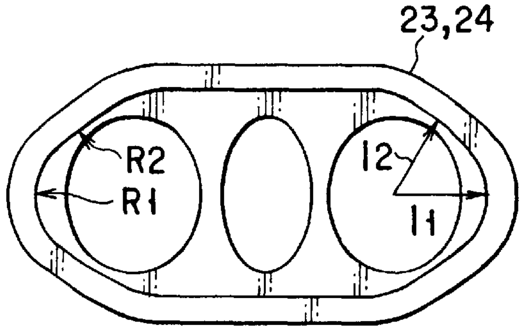
FIGS. 7A to 7C are views, respectively, showing an electron gun for a color cathode-ray tube according to the fifth embodiment of the present invention.
Figure 7B:
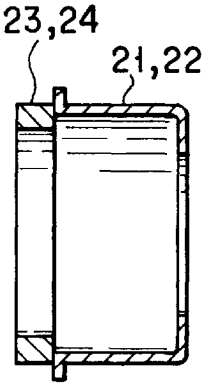
Figure 7C:
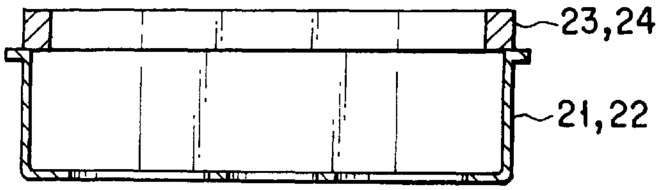

Further, the same effects can be similarly attained when, as shown in FIG. 7A, the convergence electrode G3 and the final acceleration electrode G4 respectively constitute cup-shaped electrodes 21 and 22, and only their facing cylindrical opening portions have the shape shown in FIGS. 4A to 4C, 5A to 5C, or 6A to 6C.

Although the inner circumferential surfaces of the peripheral rim electrodes 2 and 3 have an octagonal shape in the embodiments shown in FIGS. 4A to 7C, they are not limited to the octagonal shape in the electron gun of the present invention. The same effects can also be attained even if the peripheral rim electrode and the opening portion have an essentially polygonal shape with six or more sides.

The BPF main lens has been described, and the same effects can also be obtained for another type of electron gun.

A color cathode-ray tube to which the electron gun of the present invention can be applied will be described.

Figure 8:
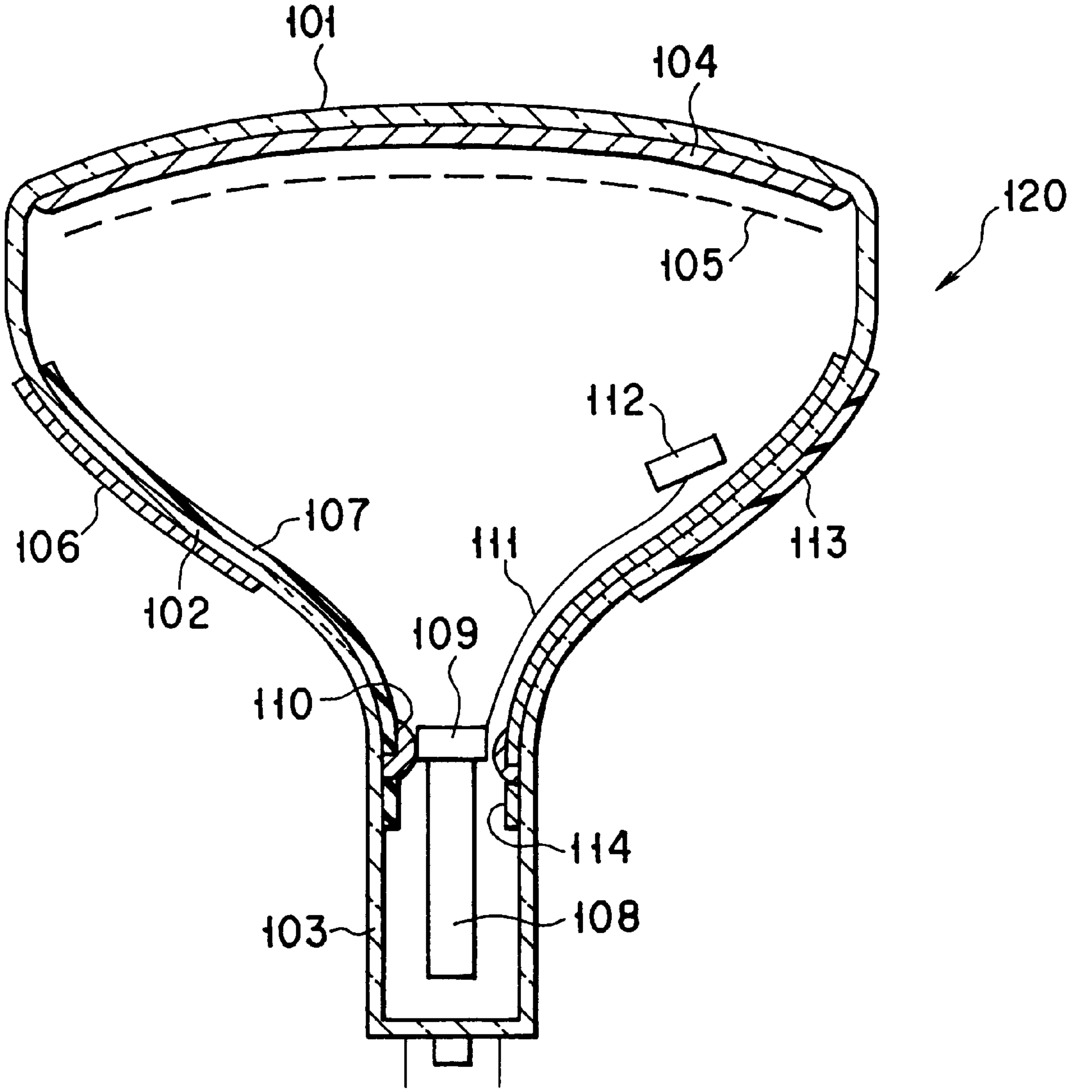
FIG. 8 is a schematic view showing an example of a color cathode-ray tube to which the electron gun of the present invention can be applied.

FIG. 8 is a schematic view showing an example of the color cathode-ray tube to which the electron gun according to the present invention can be applied.

As shown in FIG. 8, a color cathode-ray tube 120 has an envelope made up of a panel 101, a funnel 102, and a neck 103. A phosphor screen 104 made up of stripe- or dot-like phosphor layers for emitting red, green, and blue beams, and a metallized screen is formed on the inner surface of the panel 101 of the envelope. A shadow mask 105 faces the phosphor screen 104 at a predetermined interval. An inner conductive film 107 electrically connected to an anode terminal 106 formed in the funnel 102 is formed on the inner surface from the funnel 102 to the neck 103, and a getter 112 and a getter support 111 are disposed.

The electron gun 1 according to the present invention is mounted in the neck 103. A bulb spacer 110 is placed in a convergence electrode 109 of the electron gun 1 so as to contact the inner conductive film 107. An outer conductive film 113 is formed on the outer wall of the funnel 102.

A high-resistance film 114 having an electric resistance higher than that of the inner conductive film 107 is formed on the inner wall of the neck 103 so as to contact the inner conductive film 107.

In this color cathode-ray tube, of a plurality of electrodes of the electron gun 1 in use, the facing portions of the convergence electrode and final acceleration electrode forming the main lens are constructed by cylindrical peripheral rim electrodes long in the inline direction, which form aperture holes common to three electron beams. The inner circumferential surface of the peripheral rim electrode of at least one of the convergence electrode and the final acceleration electrode has an almost polygonal shape with six or more sides so as to correct a multipole lens component. With this structure, the astigmatism, coma, and spherical aberration of the side beams can be eliminated, and the effective aperture of the main lens can be satisfactorily increased. Moreover, the beam shapes of three electron beams can be made uniform, and a high resolution can be obtained over the entire screen.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electron gun for a color cathode-ray tube, comprising: three cathodes aligned in line; and a plurality of electrodes sequentially arranged from said three cathodes in a direction in which said cathodes emit three electron beams, wherein, of said plurality of electrodes, facing portions of a convergence electrode and a final acceleration electrode forming a main lens respectively construct long cylindrical common peripheral rim electrodes having aperture holes through which the three electron beams pass, and an inner circumferential surface of the peripheral rim electrode of at least one of said convergence electrode and said final acceleration electrode has one of a polygonal shape with at least six sides and a polygonal-like shape with at least six sides, angulared among each sides.

2. A gun according to claim 1, wherein the inner circumferential surface of at least one peripheral rim electrode has a corner portion between the sides of the polygonal shape.

3. A gun according to claim 1, wherein the inner circumferential surface of at least one peripheral rim electrode has a shape similar to a polygon and has at least one curved corner portion between adjacent sides of the polygon.

4. A color cathode-ray tube comprising:

an envelope made up of a panel, a funnel, and a neck;

an inner conductive film formed from an inner wall of said funnel to an inner wall of said neck;

a cathode located at an end portion in said neck; and an inline electron gun having a plurality of electrodes sequentially arranged from the cathode side at intervals so as to form an electron lens, wherein, of said plurality of electrodes, facing portions of a convergence electrode and a final acceleration electrode forming a main lens respectively construct long cylindrical common peripheral rim electrodes having aperture holes through which three electron beams pass, an inner circumferential surface of the peripheral rim electrode of at least one of said convergence electrode and said final acceleration electrode has a shape configured to correct a multipole lens component of the main lens, and said shape configured to correct the multipole lens component is a polygonal shape having substantially at least six sides.

5. A tube according to claim 4, wherein the inner circumferential surface of at least one peripheral rim electrode has a corner portion between the sides of the polygonal shape.

6. A tube according to claim 4, wherein the inner circumferential surface of at least one peripheral rim electrode has a shape similar to a polygon and has at least one curved corner portion between adjacent sides of the polygon.

* * * * *